(12) United States Patent
Shah

(10) Patent No.: US 12,078,095 B1
(45) Date of Patent: Sep. 3, 2024

(54) INTERNAL PRE-CHAMBER (IPC) IGNITION DEVICE FOR TURBULENT JET IGNITION IN RECIPROCATING ENGINES

(71) Applicant: ARAMCO SERVICES COMPANY, Houston, TX (US)

(72) Inventor: Ashish Dinesh Shah, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/336,768

(22) Filed: Jun. 16, 2023

(51) Int. Cl.
- F02B 19/14 (2006.01)
- F02B 19/04 (2006.01)
- F02B 19/12 (2006.01)

(52) U.S. Cl.
CPC .............. *F02B 19/04* (2013.01); *F02B 19/12* (2013.01)

(58) Field of Classification Search
CPC ............................ F02B 19/12; F02B 23/0603; F02B 2075/125; F02B 23/101; F02F 3/26
USPC .......................................................... 123/275
See application file for complete search history.

(56) References Cited

U.S. PATENT DOCUMENTS 9,920,684 B2 * 3/2018 Schouweiler, Jr. ... F02B 17/005

2016/0069251 A1 * 3/2016 Loetz ...................... F02B 19/06 123/286
2018/0128157 A1 * 5/2018 VanDerWege .......... F02B 19/12
2023/0047309 A1 * 2/2023 D'Epiro ............. F02M 21/0209

FOREIGN PATENT DOCUMENTS

| CN | 113882938 A | 1/2022 |
|---|---|---|
| CN | 112879145 B | 4/2022 |
| EP | 3620628 A1 | 3/2020 |
| FR | 3114614 B1 | 8/2022 |
| RU | 2719254 C2 | 4/2020 |
| WO | WO-2016075361 A1 * | 5/2016 |
| WO | 2022141952 A1 | 7/2022 |

OTHER PUBLICATIONS

Kettner et al., "The BPI Flame Jet Concept to Improve the Inflammation of Lean Burn Mixtures in Spark Ignited Engines," SAE Technical Paper 2004-01-0035, SP-1832, Mar. 2004, 12 pages.

* cited by examiner

Primary Examiner — Long T Tran
Assistant Examiner — James J Kim
(74) Attorney, Agent, or Firm — Osha Bergman Watanabe & Burton LLP (57) ABSTRACT

A reciprocating engine system includes a cylinder and a piston movable within the cylinder and having a piston head. A combustion chamber is defined within the cylinder, between the piston head, the inner cylinder wall, and a cylinder head. The engine system also includes an intermittent prechamber having a lower prechamber jaw provided on the piston head and an upper prechamber jaw provided through the cylinder head, wherein a prechamber volume is variable and directly related to a position of the piston head within the combustion chamber.

18 Claims, 8 Drawing Sheets

INTERNAL PRE-CHAMBER (IPC) IGNITION DEVICE FOR TURBULENT JET IGNITION IN RECIPROCATING ENGINES

BACKGROUND

Turbulent Jet Ignition (TJI) is an advanced ignition system with proven abilities to extend dilution tolerance (with excess air or recirculated exhaust gas) in spark ignited engines, thereby improving fuel efficiency and reducing engine-out emissions of oxides of nitrogen (a regulated pollutant).

Figure 1:
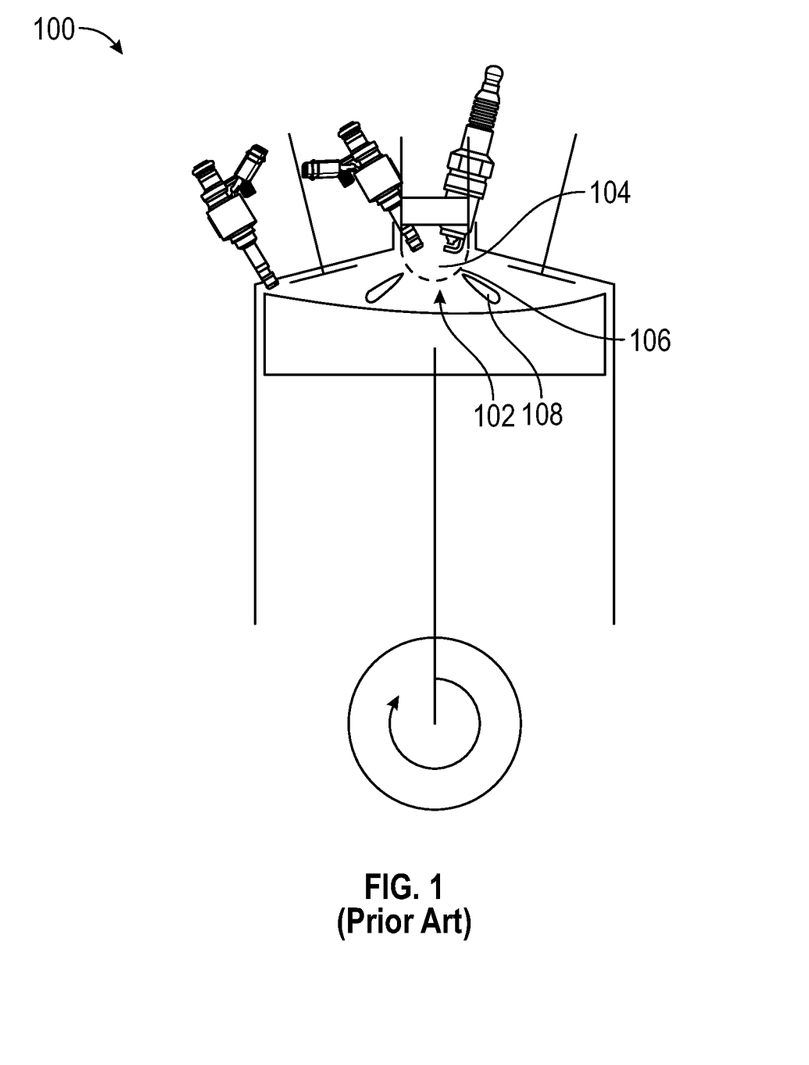
FIG. 1 shows a conventional engine cylinder with an externally mounted prechamber.

FIG. 1 shows a conventional engine cylinder 100, which includes a combustion chamber 102 with an actively fueled prechamber 104. The prechamber 104 may be fluidly connected to the combustion chamber 102 via one or more nozzles 106. A mixture of air and fuel may flow from the combustion chamber 102 into the prechamber 104 via the one or more nozzles 106 during the compression stroke. Near the end of the compression stroke, the mixture inside the prechamber 104 may be ignited by a spark plug located in the prechamber 104, leading to formation of a deflagrating flame, which releases heat. The released heat may lead to an increase in pressure within the prechamber 104, such that the pressure of the prechamber 104 is greater than that of the combustion chamber 102. Hot combustion products may then flow from the prechamber 104 into the combustion chamber 102 via the one or more nozzles 106 in the form of high-velocity turbulent jets 108. The high-velocity turbulent jets 108 may entrain and ignite fresh charge in the combustion chamber 102 through a combination of thermal, chemical, and kinetic processes, providing higher effective ignition energy for ignition in the combustion chamber 102 in comparison to conventional single combustion chamber engines.

The processes which result in turbulent jet ignition happen during the ignition window, which refers to a short time span within one operating cycle of the engine where the spark plug ignites the mixture and the pressure within the prechamber 104 exceeds that in the combustion chamber 102. Outside of this ignition window, the prechamber 104 may be considered to be a dead volume inside the engine cylinder 100.

Prior to the ignition window, compression in the combustion chamber 102 may cause flow of charge from the combustion chamber 102 to the prechamber 104. This flow may result in high-velocity jets from the combustion chamber 102 to the prechamber 104, generating high-intensity small scale turbulence inside the prechamber 104. High-intensity small scale turbulence is detrimental to robustness of the ignition and early flame kernel growth inside the prechamber 104. This may result in weaker prechamber 104 pressure rise, resulting in weaker and slower combustion in the combustion chamber 102 and reduced overall combustion stability. This effect is prevalent when the engine operates in an ultra-dilute configuration, where the overall dilution limit of the engine may be limited by robustness of ignition inside the prechamber 104.

During the time period after the ignition window, a deflagrating flame may be initiated near the periphery of the combustion chamber 102 and may travel towards the center of the combustion chamber 102. During this time, unburnt hydrocarbons (UHC) and carbon monoxide (CO) previously expelled from the prechamber 104 may flow back into the prechamber 104 due to a pressure rise in the combustion chamber 102. These partial combustion products are not consumed by the deflagrating flame in the combustion chamber 102 and may be expelled into the combustion chamber 102 during the expansion stroke. This may increase engine out UHC and CO emissions, which results in a decrease in cycle combustion efficiency.

The packing constraints of conventional externally mounted prechambers, such as prechamber 104, may restrict the degree-of-freedom of the jet umbrella angle, which inevitably induces jet-wall interactions. In some situations, jet-wall interactions can improve ignition performance by promoting mixing. However, interactions between burning jets and the combustion chamber 102 wall substantially increases heat transfer losses from the combustion chamber 102, reducing cycle thermodynamic efficiency. Additionally, directing burning jets towards the piston may affect the piston's long-term durability and structural integrity.

Conventional externally mounted prechambers have a fixed volume and a fixed nozzle area. However, the ideal prechamber volume and nozzle area may differ greatly at different operating conditions on a typical engine operating map. For example, a larger prechamber volume may be preferable at lower loads to enhance ignition energy. In comparison, a small prechamber volume may be preferable at higher loads to restrict cylinder pressure rise rate and engine knock. Given that prechamber volume and nozzle area are fixed and selected for the entire speed-load range of the engine, including special operating conditions, the potential of the turbulent jet ignition is only partially realized across the engine's operating map.

Externally mounted prechamber igniters capable of ultra-dilute combustion typically require an auxiliary fueling system inside the prechamber. Auxiliary fueling systems, for example, may include specifically designed direct fuel or air-fuel injectors capable of injecting a very small quantity of fuel. Inclusion of an additional fueling injection, which would be required for each cylinder in the engine, increases the overall cost and complexity of the engine.

An externally mounted prechamber igniter's packaging into the cylinder head generally requires modifications to the cylinder head to accommodate the larger prechamber igniter (in comparison to a spark plug). Such modifications may be challenging to implement in an existing cylinder head and may require redesigning of several sub-systems, such as the internal cooling jacket and valve location, and changes to associated manufacturing processes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to reciprocating engine systems that have a cylinder and a piston movable within the cylinder. A combustion chamber is defined within the cylinder, between a piston head of the piston, the inner cylinder wall, and a cylinder head. Engine systems according to embodiments of the present disclosure also include an intermittent prechamber having a lower prechamber jaw provided on the piston head and an upper prechamber jaw provided through the cylinder head, wherein a prechamber volume is variable and directly related to a position of the piston head within the combustion chamber.

In another aspect, embodiments disclosed herein relate to a prechamber formed in an engine, where the prechamber includes a lower prechamber jaw provided on a piston head of a piston movable within a cylinder of the engine and an upper prechamber jaw provided through a cylinder head of the engine. A prechamber volume formed between the upper prechamber jaw and the lower prechamber jaw is variable and directly related to a position of the piston within the cylinder.

In yet another aspect, embodiments disclosed herein relate to methods of operating a reciprocating engine system having a combustion chamber, a piston, and an intermittent prechamber, wherein the intermittent prechamber includes an upper prechamber jaw provided in a cylinder head of the reciprocating engine system, a lower prechamber jaw provided on a head of the piston, and one or more prechamber nozzles formed in an interface between the upper prechamber jaw and the lower prechamber jaw. Methods may include fueling the combustion chamber and the intermittent prechamber using a direct fuel injector during a compression stroke of the piston, closing the intermittent prechamber, igniting a volume of fuel enclosed within the intermittent prechamber with a spark plug, moving the piston head away from the upper prechamber jaw through the combustion chamber during an expansion stroke of the piston, and opening the intermittent prechamber.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a cylinder" includes reference to one or more of such cylinders.

In one aspect, embodiments disclosed herein relate to an internal, intermittently formed prechamber located inside the combustion chamber of an engine cylinder. More specifically, embodiments disclosed herein relate to an upper prechamber jaw mounted through a cylinder head and a lower prechamber jaw secured to a piston head, where the lower prechamber jaw is movable towards and away from the upper prechamber jaw in time with the various strokes of the piston within the combustion chamber. In another aspect, embodiments disclosed herein relate to methods and systems for fueling a prechamber directly by the combustion chamber direct injector during the compression stroke of the piston when the prechamber is in an open configuration.

In the following description of FIGS. 2-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Figure 2:
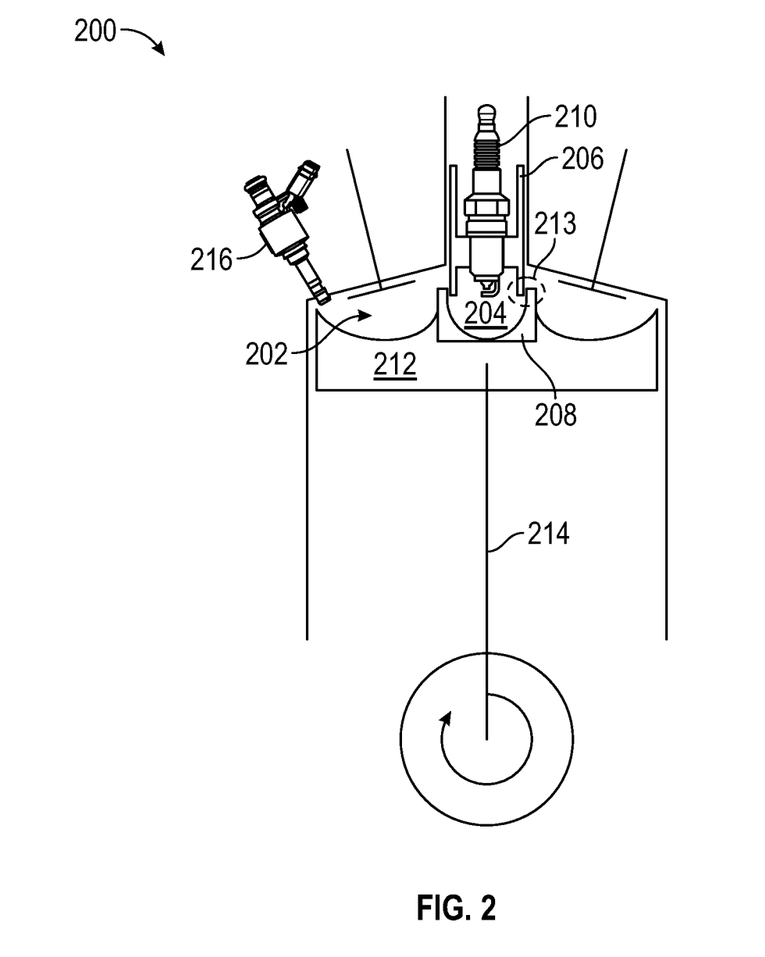
FIG. 2 shows a reciprocating engine system with an intermittent prechamber in accordance with one or more embodiments.

FIG. 2 shows a reciprocating engine system in accordance with one or more embodiments. More specifically, FIG. 2 shows a cylinder 200 of the engine system with a combustion chamber 202 and an internal, intermittently formed prechamber 204, which may also be referred to as an intermittent prechamber, in accordance with one or more embodiments. The intermittent prechamber 204 may include an upper prechamber jaw 206 and a lower prechamber jaw 208. The upper prechamber jaw 206 may be designed in the form of a sleeve mounted in the cylinder head, where the sleeve also houses the spark plug 210 for ignition inside the intermittent prechamber 204. The lower prechamber jaw 208 may be mounted to or formed on a top surface of the piston head 212, such that the lower prechamber jaw 208 is coaxial with the upper prechamber jaw 206. The inner diameter of the lower prechamber jaw 208 may be larger than the outer diameter of the upper prechamber jaw 206 or vice versa, such that one of the jaws fits around the other of the jaws as the jaws are moved axially together, and where the volume of the intermittent prechamber 204 is variable according to the position of the piston head 212 within the cylinder 200. In such manner, an intermittent prechamber is formed inside the main combustion chamber of a cylinder by a lower prechamber jaw and an upper prechamber jaw when the piston (on which the lower jaw is provided) moves towards the upper prechamber jaw.

In one or more embodiments, one or more prechamber nozzles 213 may be formed in the interface between the upper prechamber jaw 206 and the lower prechamber jaw 208 when the piston head 212 is at or near a top dead center (TDC) position. The prechamber nozzles 213 provide a fluid communication pathway between the combustion chamber 202 and the intermittent prechamber 204.

Turning now to FIGS. 3A-3D, FIGS. 3A-3D show a reciprocating engine system during different strokes of a conventional engine cycle. The piston 214 may move up and down within the cylinder 200 to intermittently form an intermittent prechamber 204 as the piston 214 moves through a conventional four stroke cycle. During the intake stroke, shown in FIG. 3A, the piston head 212 and the lower prechamber jaw 208 may move down through the cylinder 200. In such a configuration, the intermittent prechamber 204 may be considered to be open. In one or more embodiments, an intermittent prechamber may be considered to be in an open configuration when the upper and lower prechamber jaws are not axially overlapping. When the intermittent prechamber 204 is in an open configuration, the intermittent prechamber 204 may be scavenged by a fresh intake charge of intake gas (e.g., air). Further, an open configuration of the intermittent prechamber 204 may release trapped unburnt fuel and partial combustion products into the combustion chamber 202. In one or more embodiments, the partial combustion products may include, for example, unburnt hydrocarbons (UHCs) and carbon monoxide. Release of these partial combustion products into the combustion chamber 202 allows for oxidation during combustion in the combustion chamber 202, increasing combustion efficiency.

Figure 3A:
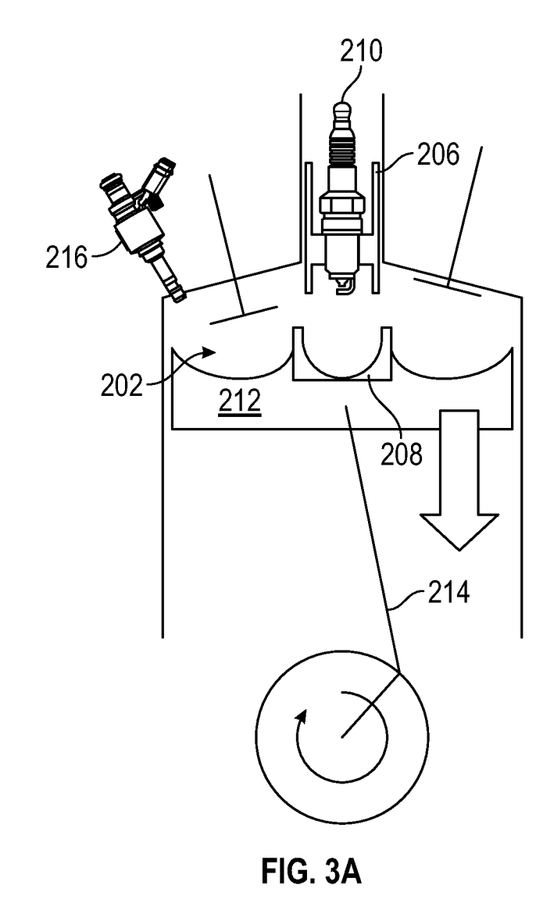
FIGS. 3A-3D show a reciprocating engine system with an intermittent prechamber in accordance with one or more embodiments.
Figure 3B:
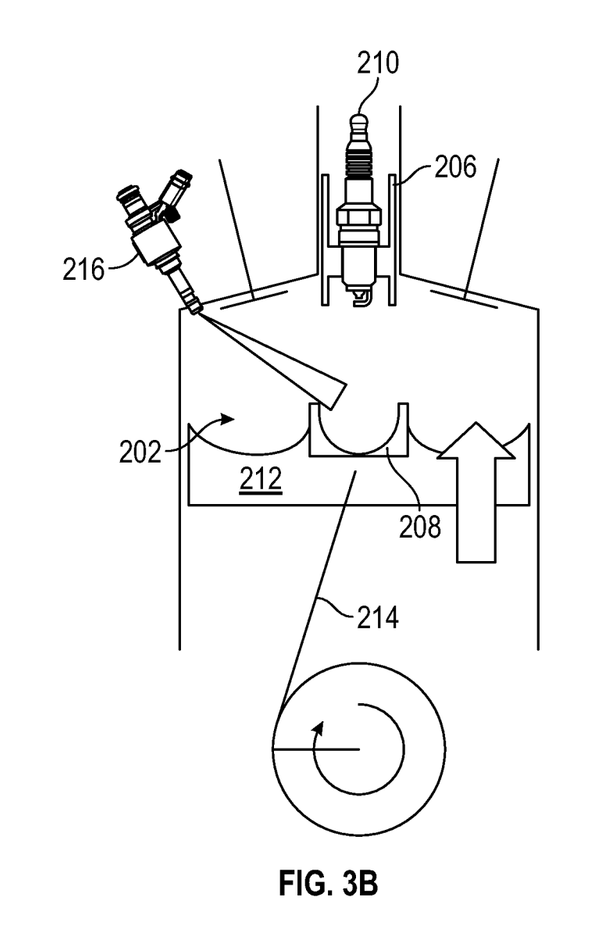

During the compression stroke, shown in FIG. 3B, the intermittent prechamber 204, which is still in an open configuration, may be internally fueled by an appropriately positioned direct fuel injector 216 mounted in the cylinder head. In one or more embodiments, the fuel injector 216 may be configured to fuel both the intermittent prechamber 204 and the combustion chamber 202, removing the need for a dedicated fuel injector inside the intermittent prechamber 204. As a result, engine cost and complexity may be reduced.

Additionally, the open configuration of the intermittent prechamber 204 during a compression stroke allows for fuel and air to enter the intermittent prechamber 204 from the combustion chamber 202 without generating jets of the fuel/air mixture entering into the intermittent prechamber 204, as occurring through nozzles of conventionally formed prechambers during the compression stroke. As a result, there is no small-scale turbulence created in the intermittent prechamber 204 that would otherwise occur from jetting through nozzles formed in conventional prechambers.

Figure 3C:
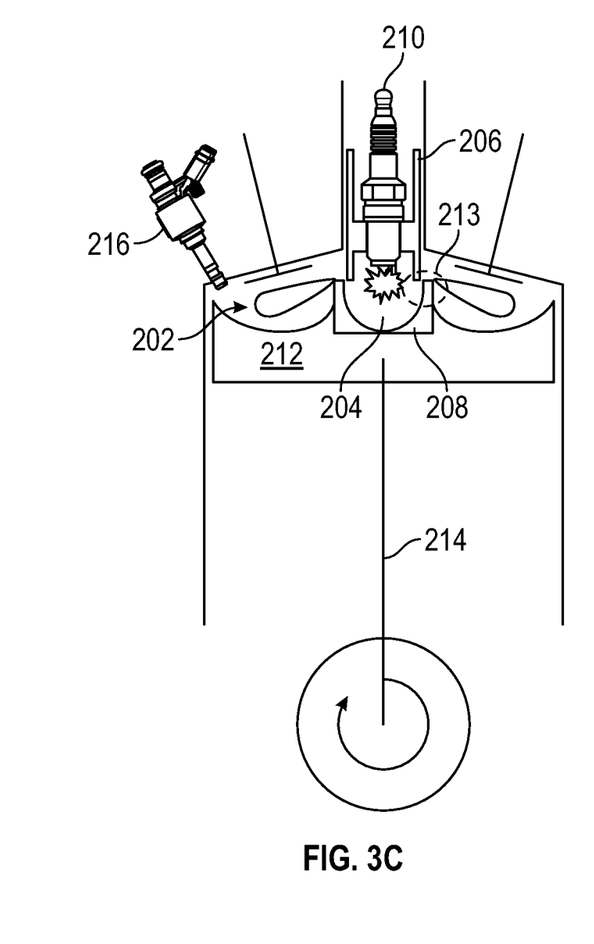

In accordance with one or more embodiments, the intermittent prechamber 204 may be formed in-situ only when required during a small crank angle window when the piston 214 is near to the top dead center (TDC) position, as shown in FIG. 3C. In one or more embodiments, for example, the crank angle window (where rotation of the crankshaft is represented by 215) in which the intermittent prechamber 204 is formed may range from −30° before TDC to 30° after TDC, for example. In-situ formation of the intermittent prechamber 204 may eliminate the formation of high velocity fuel jets from the combustion chamber 202 to the intermittent prechamber 204, increasing the engine's overall dilution tolerance. Following formation of the in-situ intermittent prechamber 204, the spark plug 210 may be used to ignite the fuel mixture held within the intermittent prechamber 204, as shown in FIG. 3C. Ignition in the intermittent prechamber 204 then initiates the expansion stroke (also referred to as a combustion or power stroke) of the cycle, where the piston head 212 moves away from the upper prechamber jaw 206.

Figure 3D:
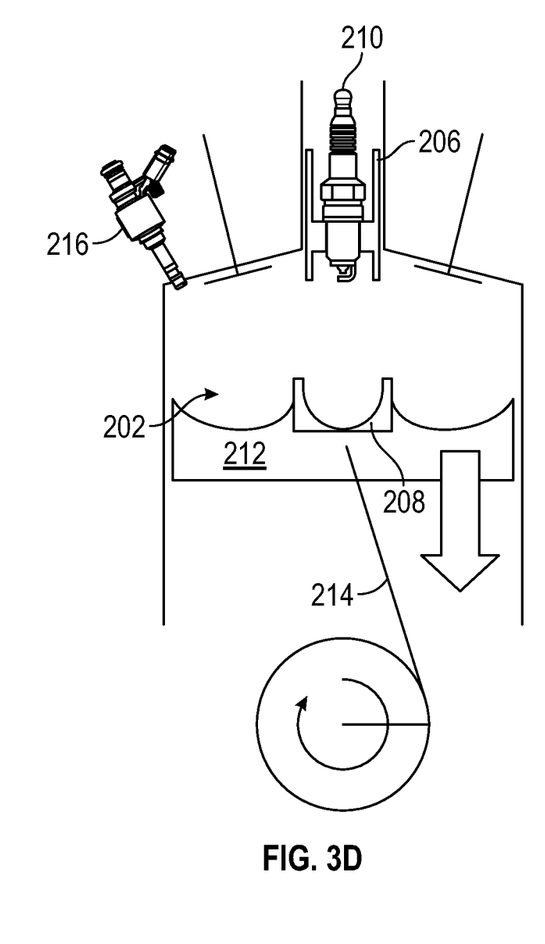

The intermittent prechamber 204 may open during the expansion stroke, e.g., at around 30° after TDC, as shown in FIG. 3D. Opening the intermittent prechamber 204 may release partial combustion products such as UHCs and carbon monoxide into the combustion chamber 202. Release of partial combustion products into the combustion chamber 202 during the expansion stroke allows for oxidation during combustion in the combustion chamber 202, increasing combustion efficiency.

After the expansion stroke, the piston may then be moved back up towards the upper prechamber jaw in an exhaust stroke (not shown) of the cycle to again form the intermittent prechamber. After the exhaust stroke, the piston may then begin a next cylinder cycle with an intake stroke. Releasing high-temperature residual gases from the previous cycle at the beginning of the next cycle intake stroke leads to effective intermittent prechamber 204 cooling at the beginning of every engine cycle. This may improve high-load performance of the engine system.

Figure 4A:
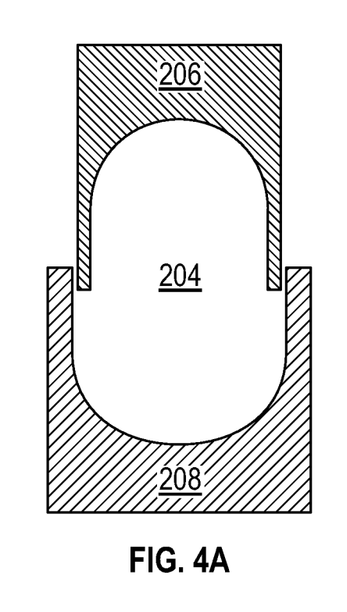
FIGS. 4A-4C show front views of an intermittent prechamber in accordance with one or more embodiments.
Figure 4B:
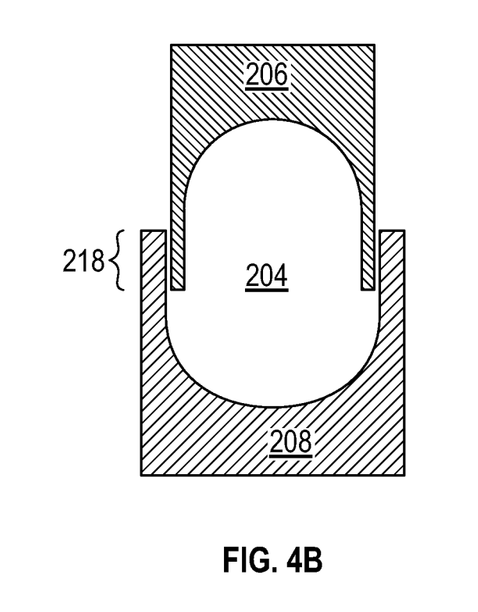
Figure 4C:
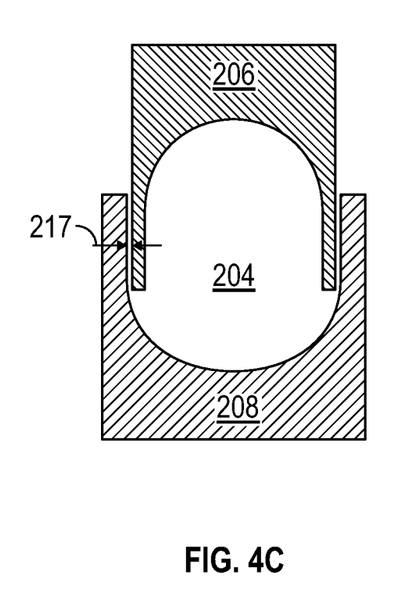
Figure 4D:
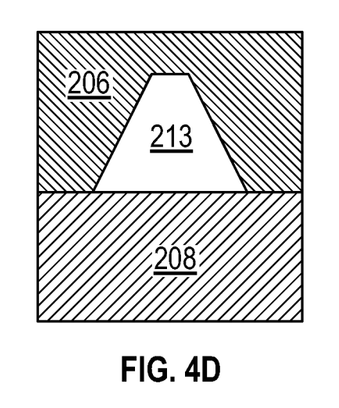
FIGS. 4D-4F show side views of an intermittent prechamber in accordance with one or more embodiments.
Figure 4E:
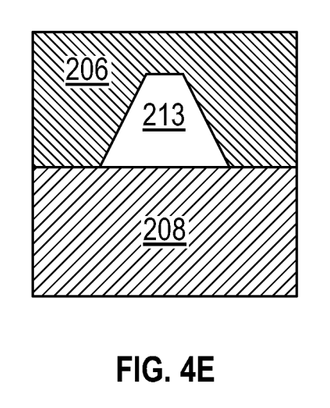
Figure 4F:
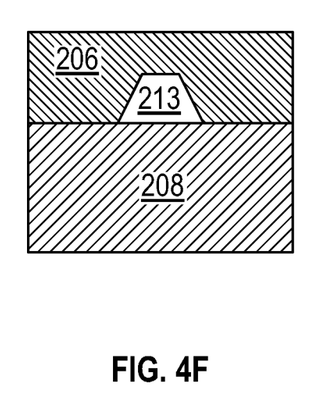

FIGS. 4A-4C show front views of an intermittent prechamber 204 in accordance with one or more embodiments. Further, FIGS. 4D-4F show side views of an intermittent prechamber 204 in accordance with one or more embodiments. As the piston head 212 moves closer to TDC at the end of the compression stroke (as shown in FIG. 3C), the volume of the intermittent prechamber 204 decreases, as shown in FIGS. 4A and 4B, reaching a minimum prechamber volume at TDC, shown in FIG. 4C. In one or more embodiments, the upper prechamber jaw 206 and the lower prechamber jaw 208 may have curved inner surfaces. However, in other embodiments, the upper prechamber jaw 206 and the lower prechamber jaw 208 may have alternately shaped concave inner surfaces. The generally concave volumes defined within the upper and lower prechamber jaws may form an enclosed prechamber volume when the openings of the upper and lower prechamber jaws are fitted together.

The inner diameter of the lower prechamber jaw 208 may be larger than the outer diameter of the upper prechamber jaw 206 or vice versa, such that one of the jaws fits around the other of the jaws as the jaws are moved axially together, and where the volume of the intermittent prechamber 204 is variable according to the position of the piston head 212 within the cylinder 200.

Figure 6:
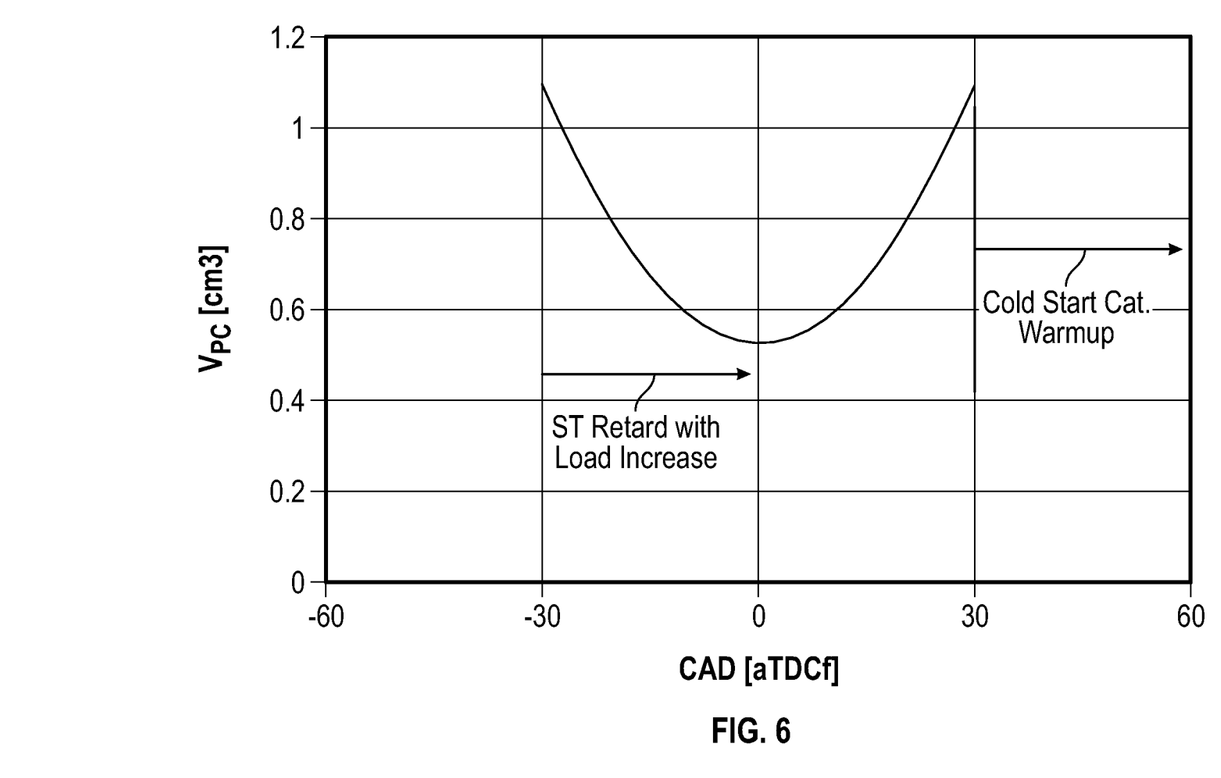
FIG. 6 shows an example of a prechamber volume and crank angle relationship according to embodiments of the present disclosure.

An example of prechamber volume variation in relation to the crank angle degree (CAD) of the crank shaft, and thus the position of the piston within the cylinder, where CAD of 0 deg. represents the TDC of the piston.

Intermittent prechamber 204 volume variation is favorable for a wide load range capability of an engine. Specifically, an increase in engine load ideally requires a smaller prechamber volume and later ignition timing to avoid knock. Further, in addition to regular engine operation, the intermittent prechamber 204 may enable robust cold-start and catalyst warm-up operating modes by allowing the engine system to operate as a conventional open-chamber spark ignited engine when operated with ignition after the intermittent prechamber 204 opens during the expansion stroke. The resulting late combustion phasing may be desired to increase exhaust enthalpy to accelerate catalyst light-off during cold-start procedures.

In addition to variable volume of the intermittent prechamber 204, the nozzles profiles may be designed to achieve a desired volume-to-nozzle area ratio, as shown in FIGS. 4D-4F. For example, for a particular engine with a given duty cycle, non-linear relationships may be desirable and appropriate, in addition to linear relationships. The shape of the prechamber nozzles 213 may be continuously variable with the volume of the intermittent prechamber 204.

For example, as shown in the embodiment in FIGS. 4D-4F, a cutout may be formed in the upper prechamber jaw 206, where the cutout has a gradually decreasing diameter along a height from a bottom of the upper prechamber jaw 206. As the lower prechamber jaw 208 is moved to TDC, the lower prechamber jaw 208 axially overlaps the upper prechamber jaw 206 and portions of the cutout along its height, thereby forming a variable sized nozzle between the upper and lower prechamber jaws 206, 208. In such manner, the relative axial movement of the upper and lower prechamber jaws covering portions of the cutout varies the size of the nozzle formed by the cutout. In one or more embodiments, a nozzle cutout may be formed on the upper prechamber jaw and/or lower prechamber jaw.

The volume of the intermittent prechamber 204 may vary within a range of 0.5%-8% of the engine's clearance volume at TDC. An engine's clearance volume may be determined by a given engine's displacement volume and compression ratio. In some engines, a clearance volume may range between 4-20% of the engine's displacement volume. Further, the intermittent prechamber 204 may have a variable total nozzle area with the total nozzle area to prechamber volume ratio, $A_N/V_{PC}$, varying within a range of 0.005-0.08 cm$^{-1}$. The final settings of these parameters may be optimized to individual applications depending on the type of engine, type of fuel, and the type of combustion strategy. In particular, these parameters may be optimized to improve ignition robustness at low operating loads and to reduce to propensity of abnormal combustion at higher operating loads.

In one or more embodiments, the axially overlapping interface (as shown by 218 in FIG. 4B) between the upper prechamber jaw 206 and the lower prechamber jaw 208 may be designed to ensure sufficient flow restriction in areas not intended to function as prechamber nozzles 213. Further, the axially overlapping interface may be designed to ensure adequate clearance (represented by 217 in FIG. 4C) to avoid interference due to design tolerance and the piston's 214 rotational and lateral displacement during engine operation. In addition, the upper prechamber jaw 206 and the lower prechamber jaw 208 may be designed to ensure sufficient conductive heat removal to avoid preignition.

Figure 5:
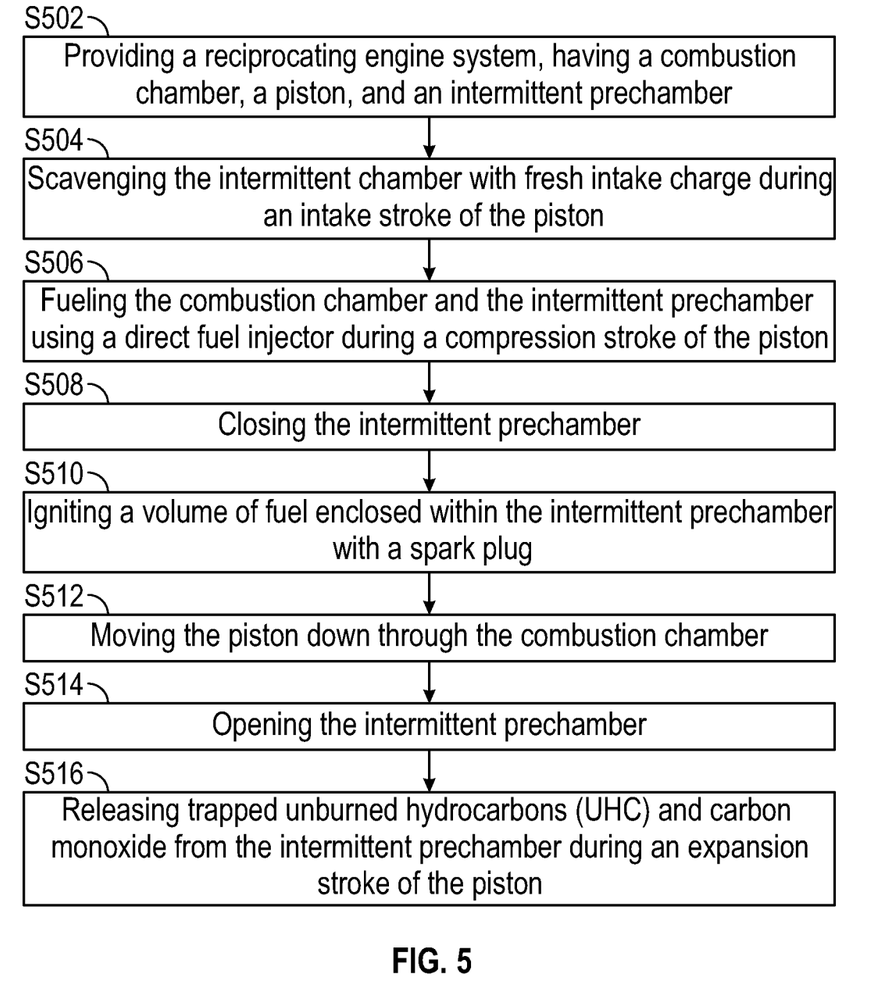
FIG. 5 shows a flowchart of a method in accordance with one or more embodiments.

FIG. 5 depicts a flowchart in accordance with one or more embodiments. More specifically, FIG. 5 depicts a flowchart 500 of a method of operating an engine according to embodiments of the present disclosure. Further, one or more blocks in FIG. 5 may be performed by one or more components as described in FIG. 1-4. While the various blocks in FIG. 5 are presented and described sequentially, one of ordinary skill in the art will appreciate that some or all of the blocks may be executed in different orders, may be combined, may be omitted, and some or all of the blocks may be executed in parallel. Accordingly, the scope disclosed herein should not be considered limited to the specific arrangement of steps shown in the flowcharts. Furthermore, the blocks may be performed actively or passively.

Initially, a reciprocating engine system may be provided, where the reciprocating engine system may include a combustion chamber 202, a piston 214, and an intermittent prechamber 204, S502. In one or more embodiments, the intermittent prechamber 204 may be integrally formed in the engine and may include an upper prechamber jaw 206 provided in a cylinder head of the reciprocating engine system and a lower prechamber jaw 206 provided on the piston head 212. One or more prechamber nozzles 213 may be formed in the interface between the upper prechamber jaw 206 and the lower prechamber jaw 208 when the jaws are moved together to partially axially overlap.

The intermittent prechamber 204 may be scavenged with fresh intake charge during an intake stroke of the piston 214, S504. A direct fuel injector 216 may be used to fuel the combustion chamber 202 and the intermittent prechamber 204 during a compression stroke of the piston 214, S506. In one or more embodiments, the direct fuel injector 216 may be mounted to the cylinder head and positioned to appropriately fuel the combustion chamber 202 and the intermittent prechamber 204, which may be in an open configuration, at the same time.

The intermittent prechamber 204 may then be closed, S508. In one or more embodiments, closing the intermittent prechamber 204 may include moving the lower prechamber jaw 208 towards the upper prechamber jaw 206 until the jaws partially axially overlap. In particular, the intermittent prechamber 204 may be closed between a first position of the piston 214 and a second position of the piston 214. The first position may occur 30° before TDC and the second position may occur 30° after TDC. In one or more embodiments, the axial height of the upper and/or lower prechamber jaws may be designed such that they axially overlap (to form an intermittent prechamber, in a closed configuration) at different crank angle degrees before and after TDC. After the intermittent prechamber 204 is closed, the volume of fuel enclosed within the intermittent prechamber 204 may be ignited with the spark plug 210, where combustion of the volume in the intermittent prechamber 204 may initiate an expansion stroke of the piston 214, S510.

After ignition of the fuel within the intermittent prechamber, the piston 214 may be moved down through the combustion chamber 202, S512. As a result, the intermittent prechamber 204 may be opened during the expansion stroke of the piston, S514. Trapped unburned hydrocarbons (UHC) and carbon monoxide may be released from the intermittent prechamber 204 during the expansion stroke of the piston 214, S516. For example, prior to the intermittent prechamber opening and during the expansion stroke, the partial combustion products (i.e., UHC and carbon monoxide) may travel through the one or more prechamber nozzles 213 into the combustion chamber 202, where the one or more prechamber nozzles 213 assist in preventing backflow of the partial combustion products into the intermittent prechamber 204. Release of the partial combustion products may also cool the intermittent prechamber 204 during the expansion stroke.

Throughout the period during which the intermittent prechamber 204 is in a closed configuration, the volume of the intermittent prechamber 204 and the nozzle area capability of the one or more prechamber nozzles 213 may be constantly varied. Specifically, the volume of the intermittent prechamber 204 may be largest at the first position and the second position and may be smallest when the piston 214 is at TDC.

Embodiments of the present disclosure may provide at least one of the following advantages. Embodiments of the present disclosure describe an intermittent prechamber which is variable in both volume and nozzle area capability. Such variability is highly favorable for a wide load range capability. For example, an increase in engine load requires a smaller prechamber volume and later ignition to avoid knock. An intermittent prechamber allows for optimization to a range of engine load ranges, rather than the current commercially used method of optimizing for an average engine load range. Further, use of intermittent prechamber may enable robust cold start and catalyst warm-up operating modes, where the intermittent prechamber allows the engine to operate essentially as a conventional open chamber spark ignited engine.

The intermittent prechamber, when in an open configuration, may be fueled simultaneously with the combustion chamber by a single direct fuel injector. Elimination of a need for an additional fuel injector within the prechamber reduces engine complexity and cost. The ability for the intermittent prechamber to be in an open configuration also allows for release of partial combustion products into the combustion chamber, increasing combustion efficiency, and also for effective prechamber cooling at the beginning of every engine cycle, improving high-load performance of the engine.

Given that the intermittent prechamber is formed in-situ only during a small crank angle window, formation of high-velocity combustion chamber to prechamber jets is eliminated, improving ignition robustness inside the intermittent prechamber and increasing the engine's overall dilution tolerance. Further, the intermittent prechamber and the one or more prechamber nozzles allow for greater flexibility in the placement and orientation of the prechamber jets, such that jet-wall interactions can be avoided. This can reduce heat transfer losses and improve thermodynamic efficiency.

Although only a few example embodiments have been described in detail above, those skilled in the art will readily appreciate that many modifications are possible in the example embodiments without materially departing from this invention. While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such through one or more dependent claim, one or more features from a claimed combination can, in some cases, be excised from the combination, and the claimed combination may be directed to a sub-combination or variation of a sub-combination. Accordingly, all such modifications are intended to be included within the scope of this disclosure as defined in the following claims.

What is claimed:

1. A reciprocating engine system, comprising:
   a cylinder;
   a piston movable within the cylinder, having a piston head;
   a combustion chamber defined within the cylinder between the piston head and a cylinder head; and
   an intermittent prechamber, comprising:
      a lower prechamber jaw provided on the piston head;
      an upper prechamber jaw provided through the cylinder head; and
      one or more prechamber nozzles formed in an interface between the upper prechamber jaw and the lower prechamber jaw,
      wherein a prechamber volume and a nozzle area are variable and directly related to a position of the piston head within the combustion chamber.

2. The reciprocating engine system of claim 1, wherein the intermittent prechamber is formed when the piston is in a crank angle window within 30 degrees from a top dead center position.

3. The reciprocating engine system of claim 1, wherein the prechamber volume comprises a minimum volume at a top dead center position of the piston.

4. The reciprocating engine system of claim 1, wherein the prechamber volume varies between 0.5% and 8% of a clearance volume of the combustion chamber at a top dead center position of the piston.

5. The reciprocating engine system of claim 1, wherein a shape of the one or more prechamber nozzles is continuously variable with the prechamber volume.

6. The reciprocating engine system of claim 1, further comprising a direct fuel injector mounted in the cylinder head, configured to fuel the combustion chamber during a compression stroke of the piston.

7. The reciprocating engine system of claim 1, wherein the intermittent prechamber further comprises a spark plug.

8. A prechamber formed in an engine, the prechamber comprising:
   a lower prechamber jaw provided on a piston head of a piston movable within a cylinder of the engine;
   an upper prechamber jaw provided through a cylinder head of the engine,
   one or more prechamber nozzles formed in an interface between the upper prechamber jaw and the lower prechamber jaw,
   wherein a nozzle area and a prechamber volume formed between the upper prechamber jaw and the lower prechamber jaw are variable and directly related to a position of the piston within the cylinder.

9. The prechamber of claim 8, wherein the prechamber is formed when the piston is in a crank angle window near a top dead center position.

10. The prechamber of claim 8, wherein the prechamber volume comprises a minimum volume at a top dead center position of the piston.

11. The prechamber of claim 8, wherein the prechamber volume varies between 0.5% and 8% of a clearance volume of the engine at a top dead center position of the piston.

12. The prechamber of claim 8, wherein a shape of the one or more prechamber nozzles is continuously variable with the prechamber volume.

13. A method, comprising:
   providing a reciprocating engine system, having a combustion chamber, a piston, and an intermittent prechamber, wherein the intermittent prechamber comprises an upper prechamber jaw provided in a cylinder head of the reciprocating engine system and a lower prechamber jaw provided on a head of the piston;

fueling the combustion chamber and the intermittent prechamber using a direct fuel injector during a compression stroke of the piston;

closing the intermittent prechamber, the closing comprising:

moving the upper prechamber jaw and the lower prechamber jaw together to form one or more variable sized prechamber nozzles in an interface between the upper prechamber jaw and the lower prechamber jaw;

igniting a volume of fuel enclosed within the intermittent prechamber with a spark plug;

moving the piston head away from the upper prechamber jaw through the combustion chamber during an expansion stroke of the piston; and opening the intermittent prechamber.

14. The method of claim 13, further comprising cooling the intermittent prechamber during the expansion stroke.

15. The method of claim 13, wherein moving the upper prechamber jaw and the lower prechamber jaw together comprises partially overlapping the lower prechamber jaw with the upper prechamber jaw.

16. The method of claim 15, wherein the intermittent prechamber is closed between a first position of the piston and a second position of the piston, wherein the first position occurs 30° before a top dead center position of the piston and wherein the second position occurs 30° after the top dead center position of the piston.

17. The method of claim 13, further comprising releasing trapped unburned hydrocarbon (UHC) from the intermittent prechamber through the one or more prechamber nozzles during the expansion stroke of the piston to prevent backflow of the trapped UHC into the intermittent prechamber.

18. The method of claim 16, further comprising varying a volume of the intermittent prechamber and a nozzle area capability of the one or more prechamber nozzles when the intermittent prechamber is in a closed configuration.

\* \* \* \* \*